(12) United States Patent
Cacace et al.

(10) Patent No.: US 8,356,649 B2
(45) Date of Patent: Jan. 22, 2013

(54) METHOD AND A DEVICE FOR REPAIRING PARTS OF COMPOSITE MATERIAL OF AN AIRCRAFT

(75) Inventors: Pierluigi Cacace, Monteiasi (IT); Nicola Gallo, Taranto (IT)

(73) Assignee: Alenia Aeronautica S.p.A., Pomigliano d'Arco, Naples (IT)

( * ) Notice: Subject to any disclaimer, the term of this patent is extended or adjusted under 35 U.S.C. 154(b) by 10 days.

(21) Appl. No.: 13/073,719

(22) Filed: Mar. 28, 2011

(65) Prior Publication Data
US 2011/0232829 A1    Sep. 29, 2011

(30) Foreign Application Priority Data
Mar. 29, 2010  (IT) .............................. TO2010A0238

(51) Int. Cl.
*B32B 35/00*         (2006.01)
(52) U.S. Cl. ........... 156/382; 156/285; 156/94; 156/286
(58) Field of Classification Search .................... 156/94, 156/382, 285, 286
See application file for complete search history.

(56) References Cited

U.S. PATENT DOCUMENTS

| | | | | |
|---|---|---|---|---|
| 2,504,684 | A | * | 4/1950 | Harper ........................ 244/218 |
| 3,837,965 | A | * | 9/1974 | Mahon et al. ................ 156/382 |
| 6,435,242 | B1 | | 8/2002 | Reis et al. |
| 2009/0294053 | A1 | | 12/2009 | Graham |
| 2010/0243152 | A1 | | 9/2010 | Helfrich et al. |
| 2011/0132523 | A1 | * | 6/2011 | Evens et al. ..................... 156/94 |

FOREIGN PATENT DOCUMENTS

| | | |
|---|---|---|
| DE | 20 2007 013 755 U1 | 3/2008 |
| DE | 10 2007 026 099 A1 | 12/2008 |
| WO | WO 2009/046932 A2 | 4/2009 |

OTHER PUBLICATIONS

Extended European Search Report for corresponding European Patent Application No. 11160028.4 mailed Jul. 25, 2011.

* cited by examiner

*Primary Examiner* — Jeff Aftergut
*Assistant Examiner* — Jaeyun Lee
(74) *Attorney, Agent, or Firm* — Merchant & Gould P.C.

(57) ABSTRACT

In order to repair a composite-material panel forming part of the external surface of an aircraft, a portable device is applied onto that surface, the portable device including an inflatable chamber consisting of a flexible and airtight membrane and a concave body of rubber-like material sealed with the membrane. The concave body incorporates an inextensible inner reinforcement. Pressurized air is introduced into the chamber via a valve. A further valve, which passes through the membrane in a zone of the membrane external to the chamber, is used to suck air from one side of the membrane to the other.

8 Claims, 2 Drawing Sheets

METHOD AND A DEVICE FOR REPAIRING PARTS OF COMPOSITE MATERIAL OF AN AIRCRAFT

This application claims benefit of Serial No. TO2010A000238, filed 29 Mar. 2010 in Italy and which application is incorporated herein by reference. To the extent appropriate, a claim of priority is made to each of the above disclosed applications.

BACKGROUND OF THE INVENTION

The present invention relates to the repair of composite-material aircraft parts. The expression "composite material" is understood as meaning a fibre-reinforced cured thermosetting resin which is widely used to produce the so-called "outer skin" of the aircraft, in particular the fuselage, the wings and the tail units. More generally, the invention is applicable to the repair of panels, beams, nose-cones (or radomes) and tail-cones.

Hitherto, in most cases, manufacturing defects such as discontinuous gluing lines or zones with excessively high porosity are repaired by applying exclusively a vacuum inside a vacuum bag. During these repair operations, a resin-impregnated patch made of carbon fibre (or glass fibre or some other fibre, depending on the type of composite material to be repaired) is applied first of all onto the defective part of the panel, arranging an adhesive sheet in between. A thermal covering layer and a vacuum bag are placed on top so as to compact the patch against the panel and evacuate the air which would prevent correct compaction. Repairs carried out using only a (low pressure) vacuum are the cause of high porosity (resulting in poorer mechanical properties) and a gluing line of unsatisfactory quality.

It has been proposed to repair composite bodies using a portable autoclave so as to obtain, owing to the pressure exerted by the autoclave, better quality repairs; the use of these autoclaves is limited because they cannot be applied directly on an aircraft or on other large composite structures. These autoclaves require in fact the introduction inside them of the part to be repaired and therefore cannot be used to repair large-size panels. Autoclaves are moreover very costly.

In the past pressurized boxes have been designed, but these required an external fixing system in order to remain attached to the panel; the boxes are sealed onto a vacuum bag, but fixing to the panel, in addition to not being easy to adapt to different situations, results in an unacceptable load on the parts. Therefore these boxes have never found a practical application.

SUMMARY OF THE INVENTION

The object of the present invention is to overcome the limitations of the prior art discussed above and, specifically, to perform high-quality structural repairs both on flat, concave or convex panels and on other parts of varying shape, for example beams, nose-cones or radomes, tail-cones, etc.

This object, together with other objects and advantages, which will be understood more clearly below, are achieved according to the invention by a method and a portable repair device.

BRIEF DESCRIPTION OF THE DRAWINGS

A number of preferred, but non-limiting embodiments of the method and the device according to the invention will now be described with reference to the accompanying drawings in which.

DETAILED DESCRIPTION OF THE PREFERRED EMBODIMENTS

Figure 1:
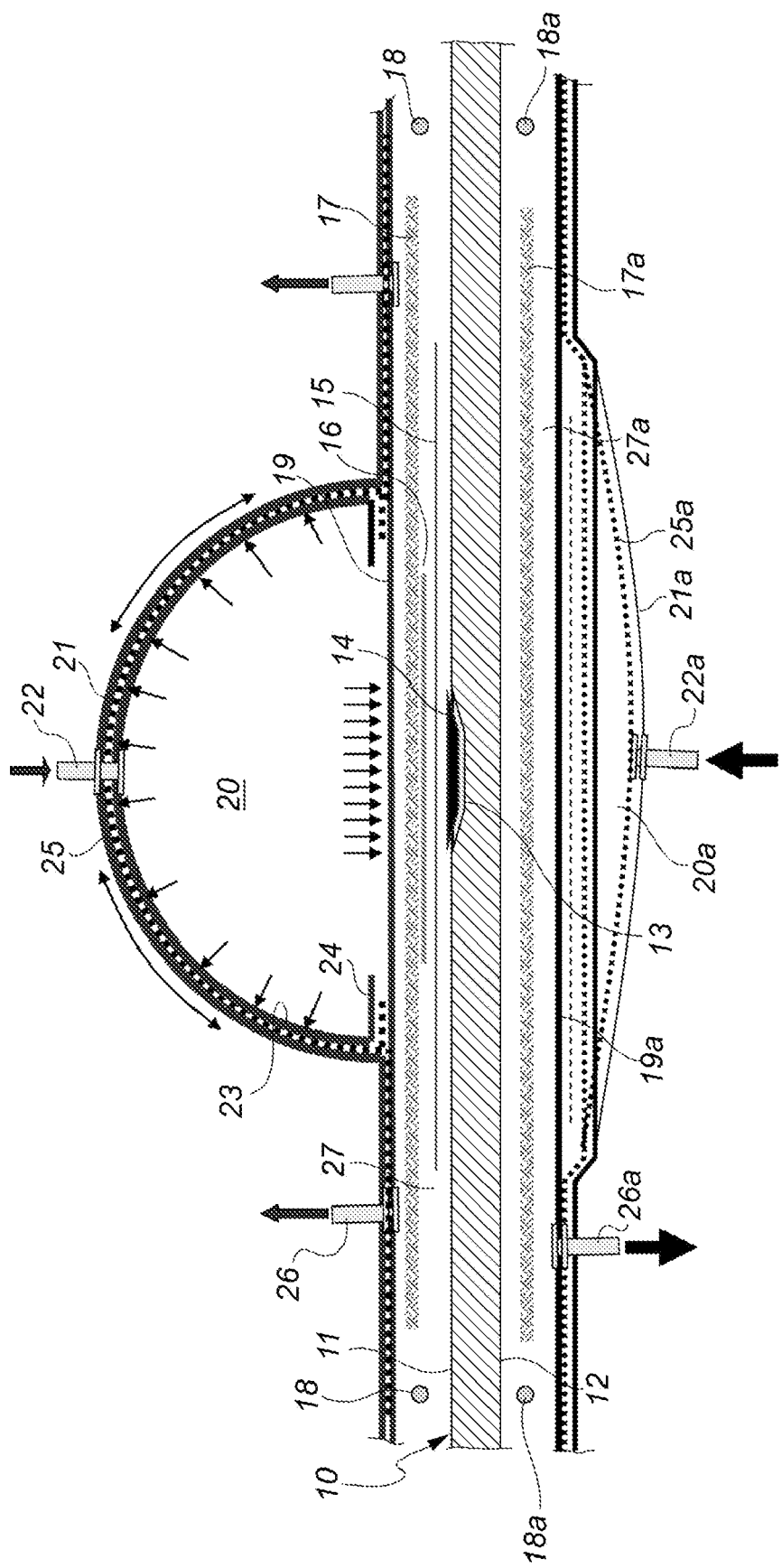
FIG. 1 is a schematic cross-sectional view of a portable repair device applied to a flat panel.
Figure 2:
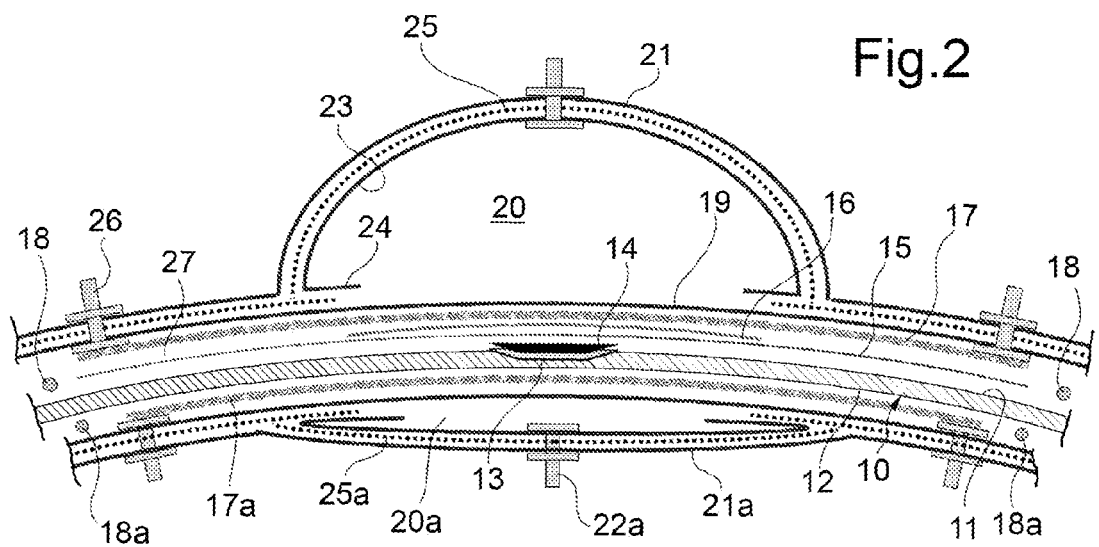
FIG. 2 is a view, similar to FIG. 1, of a portable repair device applied to a curved panel.

With reference to FIGS. 1 and 2, 10 designates a panel made of composite material which is composed of a cured thermosetting resin reinforced with fibres, usually but not exclusively carbon or glass fibres. The panel 10 forms part of the outer surface of an aircraft.

The panel 10 has two opposite sides 11, 12, one of which has a damaged or defective zone 13. A patch 14 made of fibre preimpregnated with a curable thermosetting resin (prepreg) is placed on this zone. The type of fibre and resin of the patch is chosen in each case so as to be compatible with the fibres and the resin from which the panel to be repaired is made. A parting film 15 of the type commonly used in the technology for production of composite carbon-fibre parts, for example an FEP film, a non-rigid heating layer 16 (for example a thermal covering layer) and a ventilation or breather layer 17, preferably made of polyester or glass fibre, are laid in succession on top of the patch 14.

A strip of adhesive sealing mastic (i.e. vacuum-bag sealant tape) 18 or some other closed-loop sealing element are placed on the surface of the panel around the damaged zone so as to surround the breather layer 17. Then a first unit of a portable device according to the invention is placed on the breather layer. This unit is composed of an air-tight flexible membrane 19, which covers continuously the entire area surrounded by the sealing element 18, and an inflatable chamber 20 which, when pressurized, will exert a pressure against the membrane 19 so as to press the patch 14 against the damaged/defective zone of the panel. In the preferred embodiment shown, the inflatable chamber 20 consists of the assembly composed of the membrane 19 and a concave body 21 which is superimposed on the membrane 19 and hermetically joined thereto, for example by means of gluing, or by means of vulcanisation, or using other different methods, so as to form a hermetically sealed inflatable chamber 20.

In the example shown in FIGS. 1 and 2, the concave body 21 is a dome made of rubber-like or other flexible material and provided with a valve 22 for introducing pressured air into the chamber 20, in this example via the concave body 21. The concave body 21 is preferably made of synthetic or natural rubber which has, embedded or incorporated therein, in another manner fibres or threads or plies of reinforcing fabric 25 which keep the concave body 21 substantially inextensible. The internal reinforcement 25 comprises preferably carbon or Kevlar fibres, glass fibres, vegetable fibres or metal wires.

In order to convey the pressure of the pressurizable chamber 20 onto the membrane 19, the concave body 21 according to the examples illustrated here includes a dual layer of rubber-like material, the innermost layer 23 of which has a peripheral base flange 24 which is folded in a central or inwards direction towards the zone to be repaired. The to reinforcing fabric 25 is arranged between the two layers of rubber-like material so as to limit the deformation thereof in the pressurized condition and transfer effectively the thrust of the air pressure against the membrane 19. The reinforcement 25 may consist of one or more layers, depending on the level of pressurization which is to be applied.

A suction valve or vacuum valve 26 located in a position outside the chamber 20 passes through the membrane 19 in order to create the vacuum in the space 27 defined between the membrane 19 itself, the side 11 of the panel and the seal 18. The vacuum which is thus created in this volume compresses the patch 14 against the damaged zone 13 of the panel. An additional pressure is exerted by the pressurized air inside the chamber 20.

At the same time as application of the pressure inside the chamber 20 and the vacuum inside the space 27, the prepreg patch 14 is heated by means of the thermal covering layer 16, causing curing of the resin contained in the patch which is thus integrated within the panel, combining therewith in the damaged zone and repairing it. The modes used for application of the heat and the pressure required for curing of the resin are not relevant per se for the purposes of understanding of the invention and therefore will not be described here.

The accompanying drawing shows a particular embodiment of the invention where repair of a fairly thin panel (for example with a thickness of 4.0 mm) is performed. In order to prevent the pressures and the vacuum applied during the repair stage from buckling or otherwise unduly deforming a thin panel, it has been chosen to exert a counter-pressure on the undamaged side 12, this counter-pressure being suitable for offsetting the stresses acting on the damaged or defective side 11. A breather layer 17a, surrounded by a sealing element 18a (preferably a strip of adhesive sealing mastic) and covered by a second flexible air-tight membrane 19a forming part of a second unit of the device, is applied against the side 12 in a configuration substantially symmetrical with respect to the panel. This second unit includes a further membrane 21a, which is associated with a reinforcing fabric 25a, is joined to the second flexible membrane 19a and is sealed perimetrally on the latter so as to form a second pressurizable chamber 20a into which pressurized air is introduced via an inlet valve 22a. Both the membranes 19a, 21a are passed through by a suction valve or vacuum valve 26a by means of which a vacuum is created inside the space 27a defined between the side 12 of the panel, the membrane and the seal 18a. This vacuum keeps the chamber 20a in position against the side 12 of the panel. The pressure present inside the chamber 20a opposes the pressure acting against the opposite side 11 and prevents buckling of the panel 10.

Experimental tests carried out by the Applicant have shown that the additional compaction action obtained by the pressurized chamber 20 is tripled compared to that which can be obtained with the conventional methods which envisage only the application of a vacuum bag. In order to verify the effectiveness of the present method, a load cell (not shown) was applied between the membrane 19 and the zone of the panel to be repaired. The vacuum was firstly applied via the valve 26, but without pressurizing the chamber 20. The load measured under a vacuum by the load cell was 0.022 kN owing to the effect of the atmospheric pressure on the membrane 19. When a pressure of 3.2 atmospheres was applied to the chamber 20, the load cell measured a load of 0.75 kN, acting on the patch 14, which value is more than triple the first value detected without pressurization.

According to a preferred embodiment of the invention, the depressurized space 27, which is defined by the closed-loop sealing element 18, extends over a surface with an area at least three times that of the inflatable chamber 20. The large area of this surface, which is proportional to the force with which the atmospheric pressure keeps the device pressed against the surface to be repaired, allows high pressurization levels to be obtained inside the inflatable chamber 20. The maximum pressure inside the chamber 20 is limited, in practice, only by the tensile strength of the concave body 21 with the internal reinforcement 25.

Figure 3:
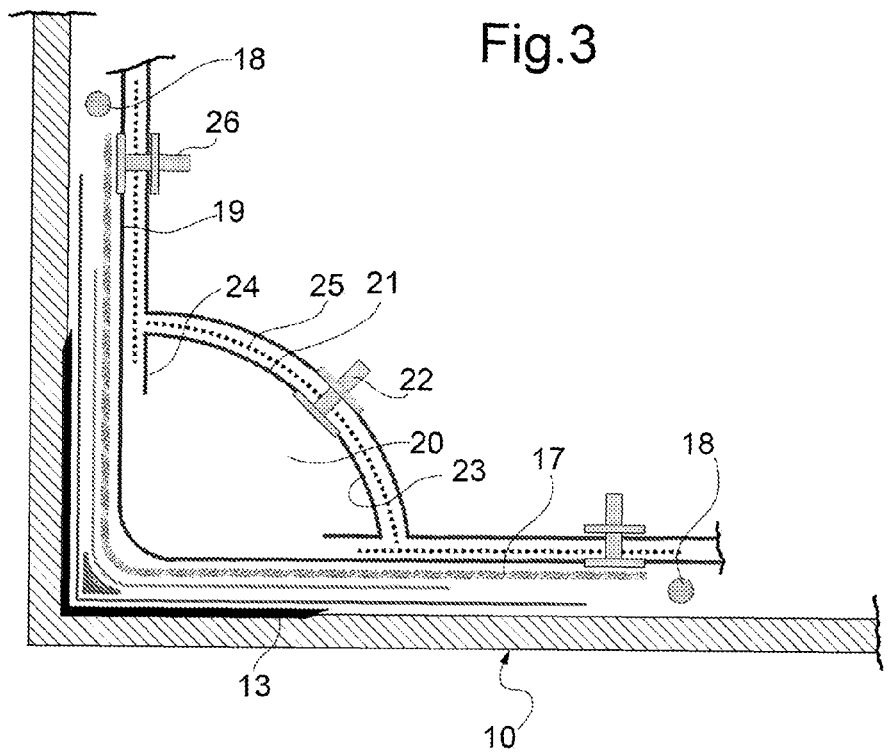
FIG. 3 is a cross-sectional view schematically showing a portable repair device applied to an angular part.

It can be understood that the present invention achieves a certain number of advantages. The compaction achieved by the pressurizable chamber produces repairs of a quality comparable to those obtained in an autoclave, with the difference that the invention allows the repairs to be performed directly on the aircraft (in situ at the airfield), without having to disassemble the part to be repaired. The costs are drastically reduced compared to the use of an autoclave. Owing to the flexibility of the membrane 19 and the rubber-like concave body 21 and the perimetral flange 24, the portable device may be applied to the base of the body 21, adapting it not only to flat surfaces, but also to curved surfaces (which may be equally well concave or convex) or surfaces with other forms which are moderately complex, as shown for example in FIG. 3. In order to adapt in the best manner possible the concave body 21 to the surface of the part to be repaired, at least the base part of the body 21, i.e. the part closest to the membrane 19, must be flexible.

In view of the high quality of the repair, the number of additional plies forming the patch may be reduced. Owing to the adhesive effect produced by the vacuum applied, external securing means are not required in order to keep the portable device against the panel to be repaired. This reduces the costs and the risk of further damage to the panel during the course of repair itself. Finally, the invention is applicable to panels of any size which are to be repaired.

It is understood that the invention is not limited to the embodiment described and illustrated here, but is to be regarded as an example; the invention may instead be subject to modifications in terms of form and dimensions, arrangement of parts and materials used. For example the invention is applicable using, as an alternative to a rubber dome-shaped body, a pressurizable container made of rigid material, provided that it is able to transfer the compaction pressure to the membrane acting on the repair patch.

What is claimed is:

1. A method of repairing an area on a surface of a composite-material part of an aircraft, the method comprising the steps of:
   a) applying a fibre patch preimpregnated with curable resin on the area to be repaired;
   b) applying a heating blanket and an airtight membrane on the patch and applying a closed-loop sealing element onto the surface surrounding the area to be repaired;
   c) heating the patch by the heating blanket and applying a vacuum between the membrane and the surface to cause compaction of the patch against the surface while pressurizing an inflatable chamber acting against the membrane to press the patch against the area to be repaired;
   wherein the step of pressurizing the inflatable chamber is accomplished by pressurizing a concave body of rubber-like flexible material hermetically joined to the membrane, the concave body incorporating an inner inextensible reinforcement;
   wherein the vacuum application step includes suction of air through a valve passing through the membrane in a position external to the inflatable chamber, so as to create a vacuum in a space defined between the membrane, the surface and the sealing element; and
   wherein the depressurized space is defined by the closed-loop sealing element and extends over a surface with an area at least three times larger than an area of the inflatable chamber.

2. A method according to claim 1, wherein, simultaneously to pressurizing the chamber against the surface, a counter-pressure is applied onto the opposite surface of the composite material part, by blowing pressurized air into a second inflatable chamber applied against the opposite surface in a position substantially symmetrical with respect to the chamber.

3. A method according to claim 2, wherein the step of applying the counter-pressure is preceded by the steps of:
- applying a second, closed-loop, sealing element onto the surface opposite to the surface to be repaired, surrounding an area of the opposite surface situated at a level of the area to be repaired;
- applying a second, airtight, flexible membrane onto the second sealing element, where the second membrane forms part of the second inflatable chamber;
- applying a vacuum in a second space defined between the opposite surface of the part, the second membrane and the second sealing element, so that the vacuum in the second space keeps the second chamber pressed against the opposite surface.

4. A method according to claim 3, wherein the first and second sealing elements are applied symmetrically onto opposite surfaces with respect to the part.

5. A method according to claim 1, wherein the method is applied to the part without disassembling the part from the aircraft.

6. A method according to claim 1, wherein the step of applying a closed-loop sealing element includes applying a strip of adhesive sealing mastic or vacuum-bag sealant tape.

7. A method according to claim 1, wherein the step of applying a closed-loop sealing element comprises laying on top of the patch in succession:
- a parting film;
- the heating blanket; and
- a breather layer;
- wherein the closed-loop sealing element is placed on the surface of the panel around the area to be repaired to surround the breather layer.

8. A method according to claim 6, wherein the step of applying a closed-loop sealing element comprises laying on top of the patch in succession:
- a parting film;
- the heating blanket; and
- a breather layer;
- wherein the closed-loop sealing element is placed on the surface of the panel around the area to be repaired to surround the breather layer.

* * * * *